US010370184B2

(12) United States Patent
Mino

(10) Patent No.: US 10,370,184 B2
(45) Date of Patent: Aug. 6, 2019

(54) TILT-LESS LINER APPARATUS AND SYSTEM FOR UNLOADING BULK CARGO

(71) Applicant: D & B D Marketing, LLC., Houston, TX (US)

(72) Inventor: Oswaldo Mino, Barcelona (ES)

(73) Assignee: D&BD Marketing d/b/a Bulk Flow, Houston, TX (US)

(*) Notice: Subject to any disclaimer, the term of this patent is extended or adjusted under 35 U.S.C. 154(b) by 201 days.

(21) Appl. No.: 15/656,263

(22) Filed: Jul. 21, 2017

(65) Prior Publication Data

US 2018/0044107 A1   Feb. 15, 2018

Related U.S. Application Data

(60) Provisional application No. 62/366,052, filed on Jul. 24, 2016.

(51) Int. Cl.
*B65D 88/54* (2006.01)
*B65D 88/26* (2006.01)
(Continued)

(52) U.S. Cl.
CPC ............ *B65D 88/546* (2013.01); *B60P 1/003* (2013.01); *B65D 88/26* (2013.01); *B65D 88/62* (2013.01);
(Continued)

(58) Field of Classification Search
CPC .... B65D 90/04; B65D 90/046; B65D 90/047; B65D 90/048; B65D 2590/046; B65D 88/66; B65D 88/72; B65D 88/26; B65D 88/546; B65D 88/54; B65D 90/043; B65D 90/42; B60P 1/60; B60P 1/62; B60P 3/2245; B65G 35/04; B65G 53/18;
(Continued)

(56) References Cited

U.S. PATENT DOCUMENTS 3,170,600 A   2/1965   Pierson
3,443,703 A   5/1969   Matsumoto
(Continued)

FOREIGN PATENT DOCUMENTS

WO    2005035372    4/2005

OTHER PUBLICATIONS

PCT/US2017/043258 International Search Report and Written Opinion dated Oct. 18, 2017.

*Primary Examiner* — Glenn F Myers
(74) *Attorney, Agent, or Firm* — Michael L. Parks; Parks & Associates, P.C.

(57) ABSTRACT

A tilt-less liner apparatus and system for unloading bulk cargo from a container liner using a first layer on the container liner floor having a friction reducing top layer and a friction enhancing bottom layer to secure first layer against movement. A second layer of flexible high strength material folded in over lapping multiple pre-folded sections from at least two to eight folded stacked layers are used to cover the friction reducing top first layer. The second layer is connected to a coiling means and motor for coiling up and removing the second layer from the container over the friction reducing top layer of the first layer and the bulk cargo comes out with the second layer into a hopper provided with means for bulk product distribution. Vibrators, depth measuring devices and speed controls are provided to control bulk cargo unloading and prevent blockage build up.

23 Claims, 9 Drawing Sheets

(51) Int. Cl.
  *B65D 88/66* (2006.01)
  *B65D 90/48* (2006.01)
  *B65D 88/62* (2006.01)
  *B65D 90/04* (2006.01)
  *B60P 1/00* (2006.01)
  *B60P 1/38* (2006.01)

(52) U.S. Cl.
  CPC ........... *B65D 88/66* (2013.01); *B65D 90/046* (2013.01); *B65D 90/48* (2013.01); *B60P 1/38* (2013.01)

(58) Field of Classification Search
  CPC ........ B65G 53/22; B65G 53/50; B65G 53/04; B65G 69/06; B65G 69/08; B65G 67/24; B60R 13/01; B60R 13/011; B60R 2013/015; B60R 2013/016; B60R 2013/018
  See application file for complete search history.

(56) References Cited

U.S. PATENT DOCUMENTS

| | | |
|---|---|---|
| 4,277,220 A | 7/1981 | Wiley |
| 4,470,749 A | 9/1984 | Koudstaal |
| 4,892,456 A | 1/1990 | Hodgetts |
| 5,040,693 A | 8/1991 | Podd, Sr. et al. |
| 5,454,685 A | 10/1995 | Podd et al. |
| 5,482,425 A | 1/1996 | Podd, Jr. et al. |
| 5,494,394 A | 2/1996 | Podd et al. |
| 5,520,496 A | 5/1996 | Podd, Jr. et al. |
| 5,547,331 A | 8/1996 | Podd et al. |
| 5,562,369 A | 10/1996 | Jones |
| 5,564,891 A | 10/1996 | Podd, Jr. et al. |
| 5,653,572 A | 8/1997 | Podd, Jr. et al. |
| 6,769,571 B2 | 8/2004 | Mino |
| 6,837,391 B2 | 1/2005 | Mino |
| 7,597,525 B2 | 10/2009 | McMahon et al. |
| 8,083,412 B2 | 12/2011 | Mino et al. |
| 8,714,820 B2 | 5/2014 | Mino et al. |
| 9,193,523 B2 | 11/2015 | Mino et al. |
| 2003/0197009 A1 | 10/2003 | Mino |
| 2004/0020937 A1 | 2/2004 | Mino |
| 2004/0035864 A1 | 2/2004 | Mino |
| 2005/0207878 A1 | 11/2005 | McMahon et al. |
| 2007/0000759 A1 | 1/2007 | Knapen |
| 2007/0024078 A1 | 2/2007 | Mino et al. |
| 2007/0267410 A1 | 11/2007 | Mino et al. |
| 2009/0159652 A1 | 6/2009 | Mino et al. |
| 2011/0198368 A1 | 8/2011 | Asraf |
| 2012/0048847 A1 | 3/2012 | Mino et al. |

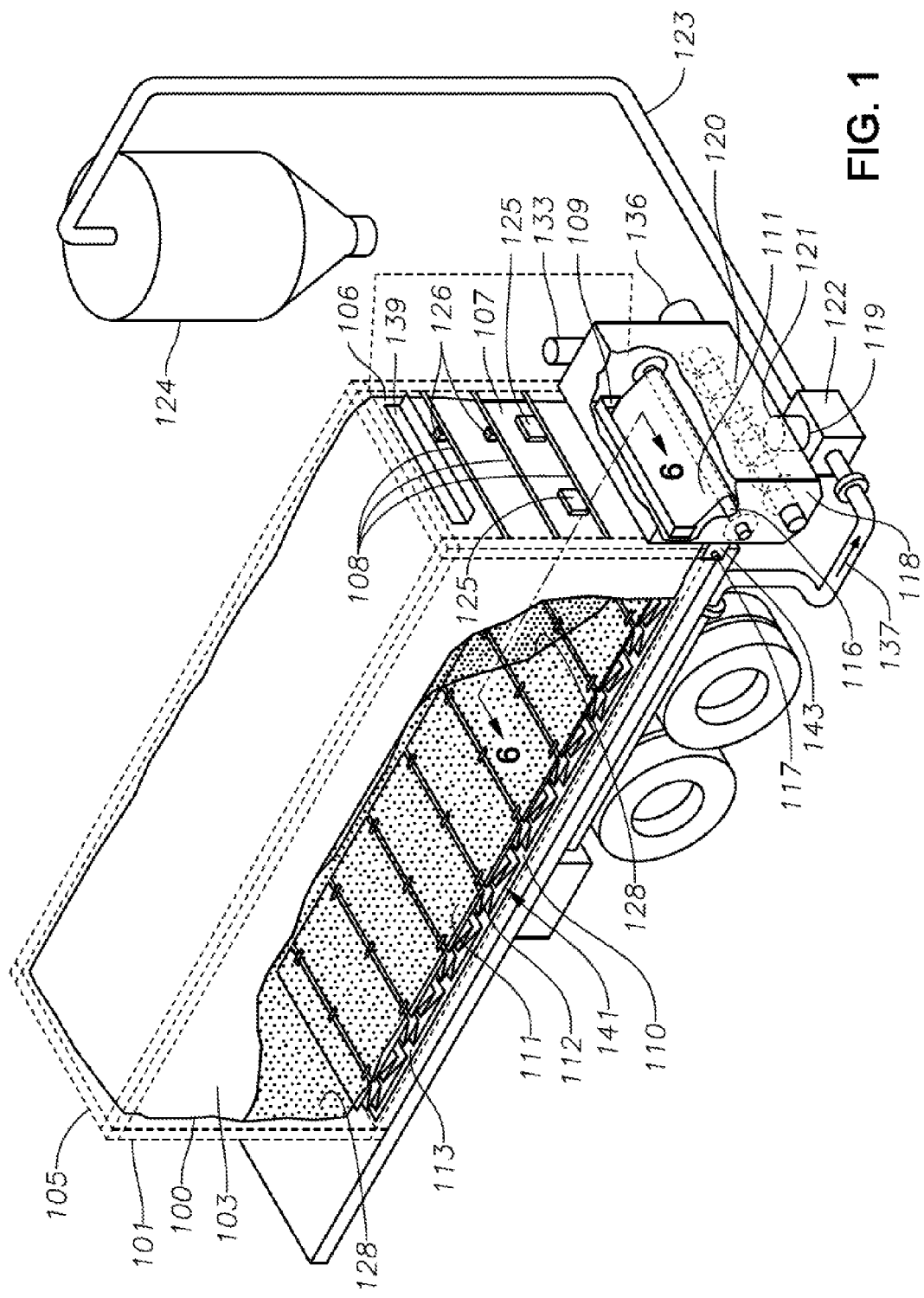

TILT-LESS LINER APPARATUS AND SYSTEM FOR UNLOADING BULK CARGO

1. RELATED APPLICATION

This application claims priority from U.S. Provisional Application No. 62/366,052 filed on 24 Jul. 2016 and entitled "Tilt-less Liner System for Unloading Bulk Cargo," the entire contents of which are hereby fully incorporated herein.

2. FIELD OF THE INVENTION

The subject matter of this invention relates to unloading dry bulk commodity cargos from containers and container liners used for transporting bulk commodities in containers, by pulling out a floor liner arranged in folded stacks of over lapping sections, from shipping container or container liners instead of tilting the shipping container and/or liner-bags to discharge the bulk commodity cargos and control the flow of the bulk commodities to other storage facilities or use or other shipping means.

BACKGROUND OF THE INVENTION

The process of unloading dry bulk cargo from containers and foldable flexible shipping container liner-bags used in containers has been to have equipment that will tilt the container while fully loaded with bulk cargo to an angle, such as 45 degrees, for causing the bulk cargo to flow out of the container or container liner-bags used in containers for unloading the bulk cargo. The equipment used to tilt the container and liner-bags used in containers varies in complexity and cost depending on the length of the container. The longer containers, such as 40 or 45-foot length containers, being most expensive and difficult to unload and the shorter containers, such as 20 or 30-foot length containers, being less expensive and easier to unload, but even with the tilting equipment, problems of discharging the bulk cargo can occur. Further, the unloading of bulk cargo by tilting the container to pour the bulk cargo out requires special handling to keep the poured bulk cargo contained and in condition to be transported, stored or separated to be used. Also, not every shipping destination has tilting equipment for any and every container size or length because of the volumes of shipping required to justify the costs of tilting equipment and its frequency of use may make the tilting equipment cost prohibitive at some shipping destinations because of lower volumes. As a result, these 40 and 45-foot bulk loaded shipping containers must be sent to specialized third party logistics 3PL's suppliers which have specialized equipment to remove the loaded container from its chassis and load it to a stationary tilting platform for the unloading of its contents to any other transportation or storage means for subsequent moves to the end destination. This extra handling and logistics adds costs, time and bottlenecks the supply chain of commodities being transported in bulk. Most importantly, the additional handling costs associated with the lack of appropriate tilting equipment for these large size containers washes-off the economics of shipping commodities in bulk form using containers and container liners. Additionally, due to the large size and lateral surface area of these larger containers, side winds make tilting chassis unsafe to operate as they may become unstable, thus requiring the use of stationary tilting platforms fixed at ground level to secure stability during the tilting phase. A stationary platform then requires the use of specialized equipment called container stackers capable of removing the loaded container from its transport chassis and loading it to the stationary platform for the unloading. These units are quite expensive and thus are only available at specialized logistic terminals.

To find other processes than tilting the container and the container liner-bags used in the unloading process of dry bulk cargo, the shipping industry has attempted to use other technologies such as laying a floor liner in a container and then loading the bulk cargo on top. Once shipped, they then tried to unload the bulk cargo by pulling the floor liner out of the container. This approach got varying and uneven results of unloading the bulk cargo from the container liners in the container. In many cases using these processes of pulling the floor liner out of the container much of the bulk cargo was left behind and in stacks caused by bridging of the bulk cargo and piling up. The incomplete results required manual laborers to go into the container liners with shovels to remove the remaining bulk cargo left behind. Also, in some applications of using the process of pulling out the liner the liners would get trapped between the bulk cargo and the container liner floor and cause the floor liners to snap or break causing the process to be stopped completely with only a part of the bulk cargo discharged from the container.

As ways around these problems of incomplete unloading of bulk cargo by pulling a floor liner out of a container liner in a container, the prior art attempted to use folded pleats only one-layer deep. The pleats ran or faced either all toward the front of a container or ran or faced all toward the back of a container, but the results were still not successful in unloading all the containers completely or all the different types of bulk cargo. The prior art had many of the same problems with breaks in the floor liners and bridging of the bulk cargo product in the container liner or at the back of the container at the bulk head creating additional problems in the unloading of the bulk cargo from the containers. So, the discharging of bulk cargo by the use of pulling a floor liner out of a container or container liner has remained economically problematic and spotty in its use.

BRIEF DESCRIPTION OF THE INVENTION

The subject of this invention relates to unloading containers and container liners in containers without having to tilt the container or container liner in the container to unload the bulk cargo shipped. Further, the invention of this tilt-less liner system is simply just loaded and positioned into the containers or container liners and then the bulk cargo is loaded into the container or container liner as well to make it ready for use at the destination for the bulk cargo without any special equipment needed or any need to tilt the containers or container liners.

The tilt-less liner system of this invention can also be reused over and over again. It can even be reshipped back to the sender of the system or on to a new user or shipped back to another shipper for repositioning in another shipment. The tilt-less liner system can even be shipped like bulk cargo in containers by stacking rolls of the tilt-less liner system in containers. These rolled up tilt-less liner systems can then be unloaded at their destination and rolled out in containers or container liners at the new destination for shipment of bulk cargo.

This subject invention can be used in all sizes of container as the shipper only needs to know the size of the container it is to be used in and get a tilt-less liner system sized for that size container.

This system also can be used with flat fluidizing systems to further enhance its unloading capabilities and eliminate further problems by fluidizing the surface between tilt-less system and the bulk cargo to further assist in unloading the bulk cargo as the tilt-less system is pulled out of the container which causes the bulk cargo to flow along with the tilt-less liner back to where it is coiled up and dump the bulk cargo into the bulk cargo catcher member.

This tilt-less liner system can also be used with a first sheet layer, which fits between the tilt-less liner system and the floor of a container or the floor of a container liner, having an upper surface for reducing the friction between first sheet layer and the tilt-less liner system on the one hand and providing a friction enhancing surface on the bottom surface on the other hand to hold the first sheet layer against moving while providing a slick liner sheet surface to reduce the friction for the tilt-less liner over the first sheet layer. This allows the tilt-less liner to be pulled out more easily and coiled up for storage or reuse while unloading the bulk cargo. This first sheet layer with the upper slick surface thus prevents the tilt-less liner sheet from sticking and being snapped or broken and or just getting stuck so it cannot be pulled out of the container liner to unload the bulk cargo.

The tilt-less liner apparatus and system of this invention also has multiple folded stacks of the floor liner stacked on top of each other to be pulled out. The pulling out process using multiple folded sheets in a stack of sheets causes micro movements of the bulk cargo into the voids created by the movement out of the individual folded stacks of the floor liner being pulled out and the downward movement of the bulk cargo and as well as the floor liner laterally moving against the bulk cargo causes more releasing of the bulk cargo from its stacked and stored position in the container. Also, because the folded stacks of the floor liners are arranged in folded alternating faced relationship to each other there are different pulling forces created against the bulk cargo to cause the bulk cargo to separate and unbridged and fall on to the floor liner. There are, also, inclined surfaces created which produce vector forces that cause the bulk cargo to break up and load on the liner as it is being pulled out.

This tilt-less liner apparatus and system even has additional benefits, which could even be problematic for container tilting systems when it comes to unloading "hard-to-flow" bulk cargo. Hard to flow bulk cargos are those cargos that tend to compact, bridge, rat-hole and/or compact by settling during shipment and thus become difficult to get them to flow out of a container liner, even sometimes when a container is tilted. These hard-to-flow bulk cargos include, for example, cement, titanium dioxide, starch, and many others that are hygroscopic. These bulk cargos can cause many problems at unloading terminals and require very specialized equipment only available at logistics terminal or may require manual labor to get these bulk cargos to flow and be unloaded. However, with the tilt-less liner apparatus and system of this invention, stringers of these hard-to-flow bulk cargos are created between the serial stacks of the floor liner during loading of the cargos, that are then broken up when the floor liner is pulled out, which transfers break-up forces to these bulk cargos and allows them to flow with the rest of the movement of the floor liner out of the container. The tilt-less liner system of this invention, in its simplest form or in combination with its fluidizing component, is able to overcome the problems associated with unloading hard to flow bulk cargos and makes more bulk cargos of all kinds available for shipment to a wider range of destination terminals free of problem.

DETAILED DESCRIPTION OF THE INVENTION

The tilt-less liner apparatus for unloading bulk cargo from containers or container liners in a container without tilting the container and the system for controlling the bulk cargo unloaded, is formed by placing a floor liner made from a flexible high strength material for lining the floor of the container or container liner which is arranged in over lapping multiple pre-folded rectangular sections over the floor of a container or container liner and then just loading the bulk cargo on top of the floor by just filling the container or container liner. Once the container or container liner in a container is shipped to its destination with the bulk cargo on the tilt-less liner it is simply connected to its removably member for pulling out the tilt-less liner floor by coiling it up on the axle of the removable member and the bulk cargo is thus moved out with the tilt-less liner floor which causes the bulk cargo to follow on top of the tilt-less liner floor out of the container.

The removable member is connected in some embodiments by connection to the container corner brackets on the bottom of the container. Then a port proximate the floor of the container is opened and the tilt-less liner floor is connected to the axle in the removable member which is driven by a powered motor or engine to coil the floor liner there about the axle and start pulling the over lapping multiple pre-folded rectangular sections out of their pre-folded and stacked relationship over the floor out of the container which causes the bulk cargo which is laying on the floor liner to follow the floor liner toward the port of the container and the bulk cargo starts to break up and land on the newly exposed sections of the over lapping multiple-folded rectangular sections of the tilt-less floor liner and the snapping movement of the prearranged folds causes further bulk cargo to start falling on the moving floor liner of the tilt-less liner system as more and more of the bulk cargo is dislodged and moved out of the container.

A catcher member is provided below the axle for catching the bulk cargo as the tilt-less floor liner is coiled up and the bulk cargo drops off the tilt-less floor liner as it is coiled. A gravitational scraper effect can be created by having the coiling axle of the catcher member positioned to create an angle which in some embodiments is at least 45 degrees or more below the floor level of the container.

The bulk cargo is dropped off the tilt-less liner floor, as it is coiled up on the axle, into a bulk cargo handling system like a hopper for moving the bulk cargo to a desired location. The hoppers can be of different kinds depending on the type of bulk cargo being unloaded. They can be free flowing product type hoppers, which are physically just below the retrieving coil and have sloping sides having angles of repose of 30 degrees or less which are connected to a funnel to allow the free-flowing bulk cargo out of the hopper. These hoppers can also be screw feeding hoppers that have drives at both ends of the hopper for feeding the bulk cargo from the sides of the hopper to a funneled center discharge point or central hole which sends the bulk cargo to a rotary valve which delivers the bulk cargo to a silo or other means. These screw feeding hoppers are used with bulk cargo that has an angle of repose of more than 30 degrees and tends to clump together and form big chunks, which the screw feeders tend to break up before it is connected to a line for delivery to the silo or other means. Yet, at least, another type hopper may be used with bulk cargo having angles of repose also higher than 30 degrees. These hoppers have a suction pipe positioned transversally across the receiving hopper and an opening gap which aligns and faces the bottom from where the bulk cargo is received into the receiving hopper to guarantee a minimum of residue to collect in the hopper because it is suctioned off as soon as it drops into the hopper.

The highly effective process of pulling the tilt-less liner floor out of the container floor is achieved by having to only pull one of the over lapping multiple pre-folded sections one at a time, which limits the forces required to move that section of the over lapping pre-folded section, until it starts to pull the next over lapping multiple pre-folded section. The forces required to pull one of the pre-folded rectangular sections are determined by the area per folded section based on the density of the bulk cargo per square inch over the over lapping pre-folded section above it and the coefficient of friction between the tilt-less liner floor and first layer means over the container floor or container liner floor. So, by adjusting the size of the sections of over lapping pre-folded sections a pulling force can be calculated and created so that it will not cause the tilt-less liner floors to tear or to not move.

There are at least several ways to make this pulling force more effective. One is to strengthen the tilt-less liner floor by providing reinforcing strips that increase the strength of the tilt-liner floor to allow it to pull a greater density of bulk cargo deposited on it and/or to reduce the coefficient of friction between the floor of the container or container liner and the tilt-less liner floor or in some cases both.

In the case of providing means for reducing the coefficient of friction between the container floor or container liner floor and the tilt-less liner floor, this can be achieved in several ways. One way is by placing a first floor layer having an upper surface with a low coefficient of friction on the floor of the container or container liner for allowing easier movement of the floor liner across and out of the container or container liner when being pulled out by the member removably connected to the floor liner or container liner for coiling the floor liner. Another way is to provide a fluidizing system means positioned between the second floor liner and the floor of the container or container liner for allowing easier movement of the floor liner out of said container or container liner when being pulled out by the coiling means removably connected to the second floor liner for coiling the floor liner.

A fluidizing system can also be used in addition to providing a lower coefficient of friction layers between the container floor or container liner floor and the second floor liner, to also allow fluidizing fluids to pass through said floor liner to fluidize said bulk cargo as said second floor liner is pulled out by coiling the second floor liner. This fluidizing aids in releasing additional bulk cargo out of the container as the second floor liner is pulled out.

BRIEF DESCRIPTION OF THE DRAWINGS

The invention is herein described, by way of example only with reference to the suggested accompanying drawings wherein the detailed descriptions are for the purpose of fully disclosing preferred embodiments of the invention without placing limitations thereon.

FIG. 1. is a perspective view of a container in phantom lines mounted on a truck trailer showing the tilt-less floor liner system composed in part by a second floor liner laid out over the first layer member and a coiling member for removing the second floor liner by pulling the second floor liner out of the container over the first layer member by coiling it on the coiling member removably connected to the second floor liner. A catcher member or hopper is provided for the controlled receiving of the bulk cargo as it is removed from the container. A section 6-6 shown taken through the tilt-less floor liner is further shown in FIG. 6.

FIG. 1A shows how the bulkhead end of the container liner is formed with the steel bars across the end of the container liner to hold the bulk cargo in the container when it is loaded and the port through which the second floor liner will be pulled to unload this container without tilting the container.

FIG. 3 also shows the motors for driving the coiling member and the helical screw auger which feeds to the middle of the hopper from both sides for processing the bulk cargo for redistribution through the distribution members at the bottom of the hopper member. FIG. 3 also shows the pressure sensors mounted on the steel bars for sensing the press if any of the bulk cargo against the container liner against the bulkhead and the bracket for the ultra-sound depth sensor that measures the depth of the bulk cargo against the container liner at the discharge port at the bulk head, if any accumulates.

FIG. 3A also shows the motors for driving the coiling member and the helical screw auger which feed to the middle of the hopper from both sides for processing the bulk cargo for redistribution through the distribution member at the bottom of the hopper member. FIG. 3A also shows the pressure sensors mounted on the steel bars for sensing the pressure if any of the bulk cargo against the container liner at the bulkhead and the bracket for mounting the ultra-sound depth sensor that is inserted through the instrument port created at the top of the bulkhead formed in the container liner to measure the depth of the bulk cargo against the container liner at the discharge port at the bulk head.

FIG. 6 also shows the interface of the friction lowering upper surface of the first layer member with the surface of the second floor liner for easy sliding of the second floor liner there over as the second floor liner is pulled out by the coiling member.

DETAILED DESCRIPTIONS OF PREFERRED EMBODIMENTS OF THE INVENTION

Figure 1A:
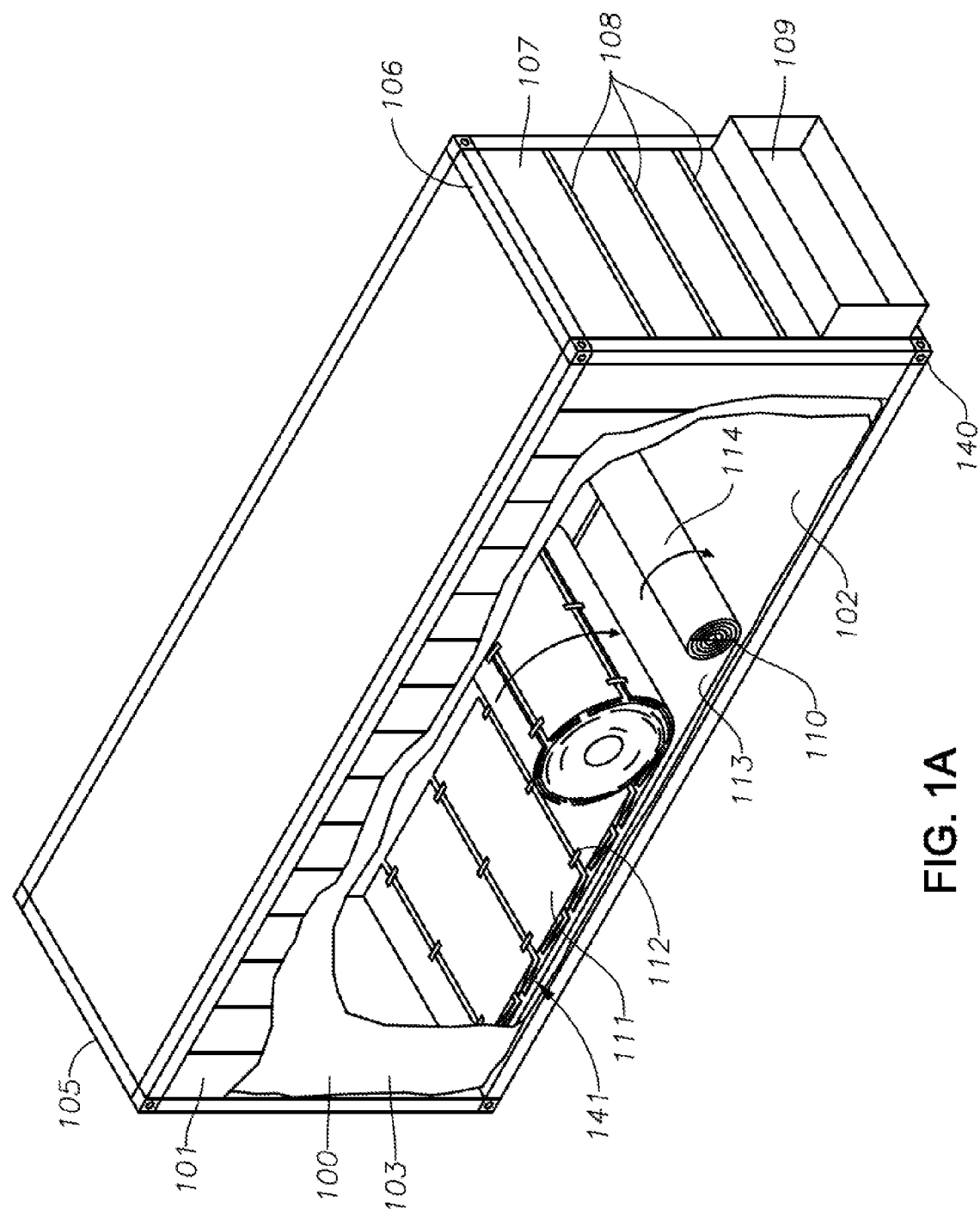
FIG. 1A shows a perspective view of a container with cut aways which show how the apparatus of the first layer means having a friction lowering upper surface and a friction promoting lower surface and second floor liner having folded stacks of over lapping multiple pre-folded sections of this invention are put in place by being rolled out within the container and the container liner before the loading of the bulk cargo on to the apparatus of this invention in the container. It also shows how the breakable tape applied to the second floor liner is used to hold the folded sections of the second floor liner in place during the roll out installation. Further this
Figure 2:
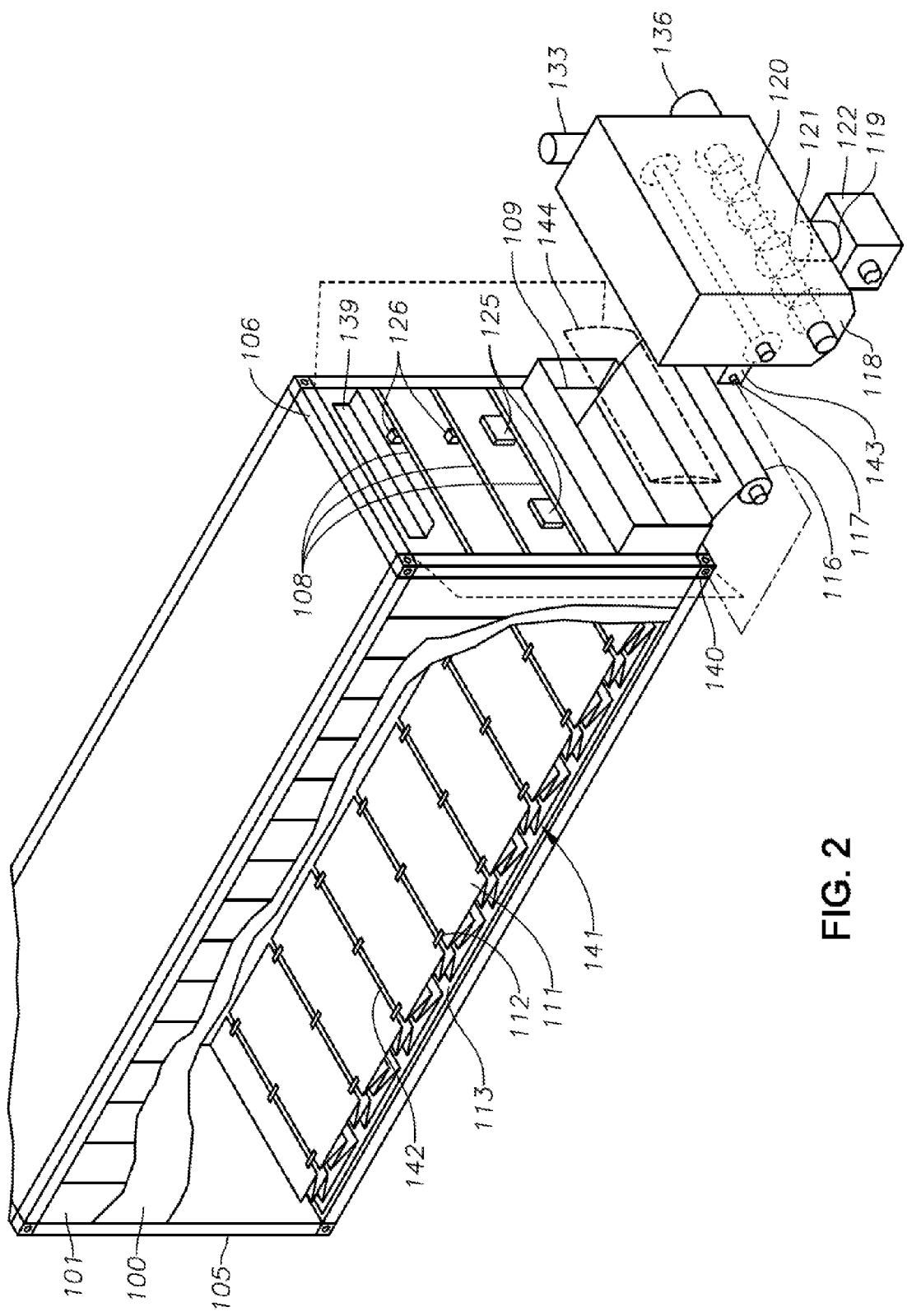
FIG. 2 shows a perspective view of a container with cut aways which show the apparatus of the first layer member and second floor liner of this invention in place within the container and the container liner with the coiling member and hopper member in a removed position, but oriented for attachment with the container in the container bracket and with connection to the second floor liner by placement of the second floor liner already coiled on an axle for placement on the coiling member by connecting it to the coiling member for allowing coiling of the second floor liner on to the coiling member. Also shown is a hydraulic pillow, in phantom lines for being placed in the port of the bulkhead created in the container liner to prevent discharging bulk cargo when loading the container and container liner with bulk cargo. Further shown are a pair of vibrators mounted on a steel bars and pressure sensors also mounted on steel bars on the bulk head end. Also shown is an instrument port located at the top of the bulkhead for use with instruments to be inserted for taking readings inside the container liner.

Reference will now be made in detail to some of the present preferred embodiments which illustrate some of the concepts of this invention without limitation but to teach the broad concepts of this invention as applied.

In the embodiment as shown in FIG. 1, a container liner 100 is shown already installed in a container 101. The container liner 100 has a linear liner floor 102 located the length of the container 101 and the width between two sidewalls 103 and 104 and a front end 105 and a backend 106. The backend 106 is formed into a bulkhead 107 by the addition of steel bars 108 being placed across the backend 106 of the container liner 100 and a port 109 is provided in the bulkhead 106 substantially the width of the container floor for allowing unloading the bulk cargo therethrough. Also provided is an instrument port 139 at the top of the bulk head 107. This embodiment in FIG. 1 also shows the apparatus and systems in place for the removal of the bulk cargo without having to tilt the container to remove the bulk cargo by providing a second floor liner 111 connected to a coiling member 116 which is removably mounted to the container 101 at its corner brackets 140. Positioned in functional relationship with the coiling member 116 is a hopper member 118 which is also functionally positioned to operate with a distribution member 119 once the unloading process begins.

While much can be learned from the tilt-less liner apparatus as shown installed in FIG. 1, much can be additionally learned by referring to a method of installation of the tilt-less liner apparatus which is shown in FIG. 1A. This method of installation in this embodiment is accomplished by simply rolling out a first floor layer 110 over the length of the linear liner floor 102 of the container liner 100 and then rolling out a second floor liner 111 over the first floor layer 110. The second floor liner 111 is arranged in a series of stacks of pre-folded sections 141, which will be discussed later, but are held together by tape strips 112 placed between the openings 142 between the stacks of pre-folded sections 141 of the second floor liner 111 to hold them together during the rolled out installation in preparation for the transport of the bulk cargo.

To better understand the functionality of the tilt-less liner system parts installed before loading the bulk cargo and the effects of loading the bulk cargo, the interaction between them should be explained. The first floor layer 110 is composed of a friction lowering upper surface 113 and a friction promoting lower surface 114. It should be understood that when the bulk cargo as shown in FIG. 1 is loaded on top of the second floor layer 111 and first floor layer 110 that the weight of the bulk cargo will create pressure on the second floor layer 111 and first floor layer 110 which will force the friction promoting lower surface 114 of the first floor layer 110 to grip the linear liner floor 102 of the container liner 100 to prevent the first floor layer from moving when the second floor liner 111 is pulled out, as will be explained further here in, as well as the fact that the effect of the friction lowering upper surface 113 will promote the easy sliding of the second floor liner 111 over the first floor layer 110 to allow easy removal of the second floor liner 111 out of the container liner 100 for bulk cargo removal as well with the second floor liner 111 removal, thus no tilting of the container is required for unloading the bulk cargo.

To better understand how the second floor liner 111 is removed from the container 100 and how its removal stimulates and causes the bulk cargo to be removed from its stacked condition over the second floor liner 111, a description of the configuration of the second floor liner 111 and the mechanism for causing its removal will need to be explained.

In FIG. 1 the mechanism for the removal of the second floor liner 111 is created at the end of second floor liner 111 at the bulkhead 107 where the second floor liner 111 is connected to a coiling member 116 which is removably connected to the container 101 at its corner brackets 140 with mounting brackets 117 and which also positions a hopper member 118 and distribution member 119 which are mounted in functional relationship with the coiling member 116 for the pulled out removal of the second floor liner 111 from the container liner 100 and the removal of the bulk cargo with second floor liner 111 for discharge into the hopper member 118 and distribution member 119.

Figure 4:
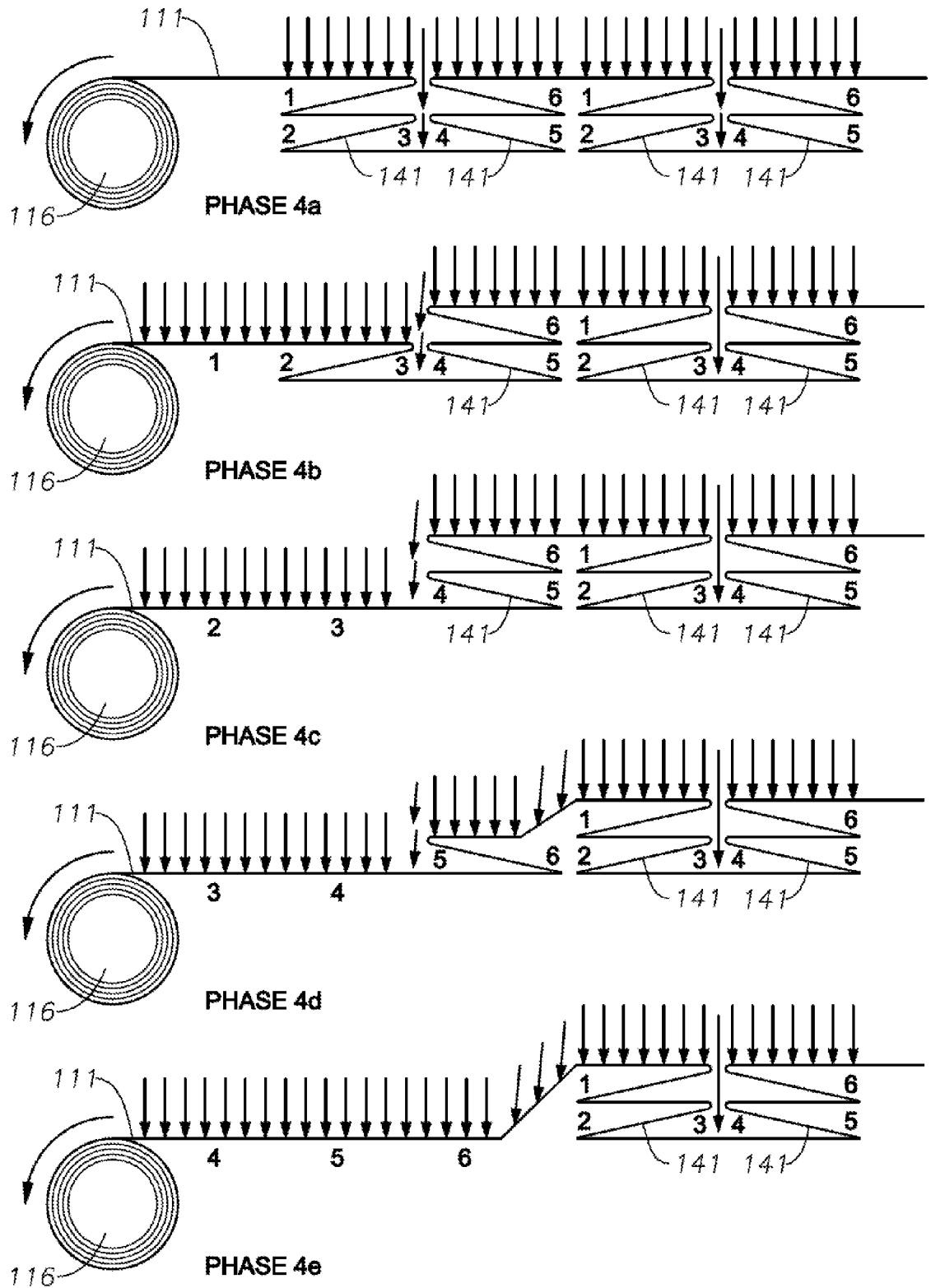
FIG. 4 is a series of Phases 4a, 4b, 4c, 4d, and 4e which show the bulk cargo represented as arrow forces being applied to the second floor liner, which is arranged in folded stacks of over lapping multiple pre-folded sections, when bulk cargo is loaded on the second floor liner and how these forces are applied to the bulk cargo to break it up by the unfolding of the pre-folded sections of the second floor liner when the second floor liner is removed by the coiling member.
Figure 5:
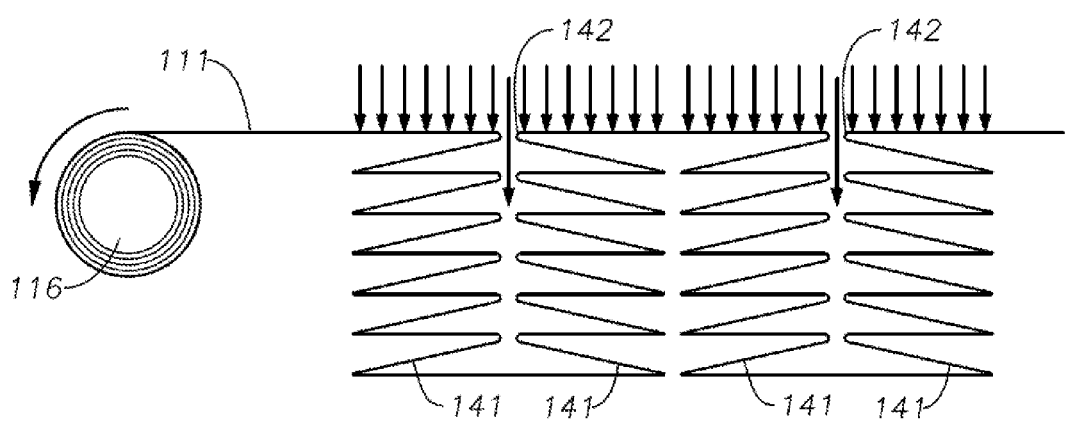
FIG. 5 shows how additional layers of the second floor liner arranged in folded stacks of over lapping multiple pre-folded sections of six folded layers stacked over the first layer means would be positioned for removal of the second floor liner and bulk cargo in much the same way as shown in FIG. 4, but with more forces being applied by having six folded layers.

The configuration of the second floor liner 111 is such that it interfaces with the bulk cargo to create different pulling force effects for loosening the bulk cargo to fall or lay on the moving surface of the second floor liner 111 for its removal with the removal of the second floor liner 111 as it is removed from the container liner 100. These different pulling force effects are created by the second floor liner 111 being of a flexible high strength material which can be pulled with load on it and being arranged in folded stacks of over lapping multiple pre-folded sections 141 of from at least two, as shown in FIG. 1 to up to 10 folded stacks, with six shown in FIG. 5, arranged over the first floor layer 110 which cover the floor of the liner floor 102 of the container liner 100. Also, these flexible high strength materials being arranged in folded stacks of over lapping multiple pre-folded sections 141 can additionally be further arranged to increase pulling force effects by being arranged in serial stacks of over lapping multiple pre-folded sections of from at least two to up to ten folded layers stacked and arranged with the folds of said pre-folded sections being in alternating opposite directions 143, such as shown in FIG. 4 and FIG. 5. In magnification and by explanation of a staged theoretical removal it will be seen how these different pulling forces created by the over lapping multiple pre-folded sections 141 will cause the bulk cargo to break up and follow the second floor liner 111 out of the container when the second floor liner 111 is pulled out by the coiling member 116 and that will be discussed in further detail later herein.

Figure 3:
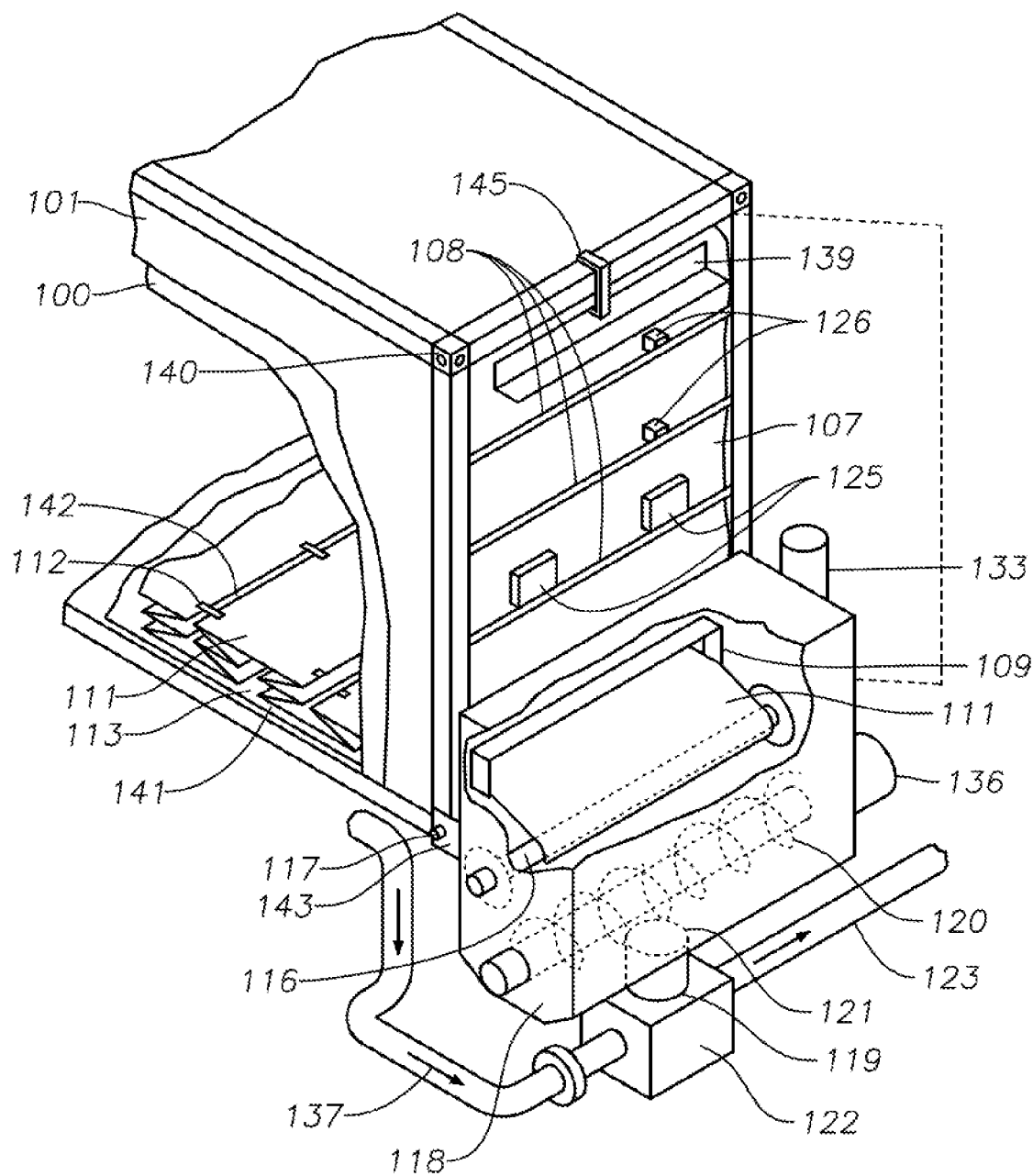
FIG. 3 shows a partial perspective view of the bulkhead end of the container with cut aways of the container and the coiling member and hopper member connected and shows the second floor liner being coiled up as can be seen by the movement of the second floor liner which has broken the taped connection on second floor liner at the first folded stack of over lapping multiple pre-folded section to start the removal of the second floor liner and bulk cargo from the container and container liner without tilting the container.
Figure 3A:
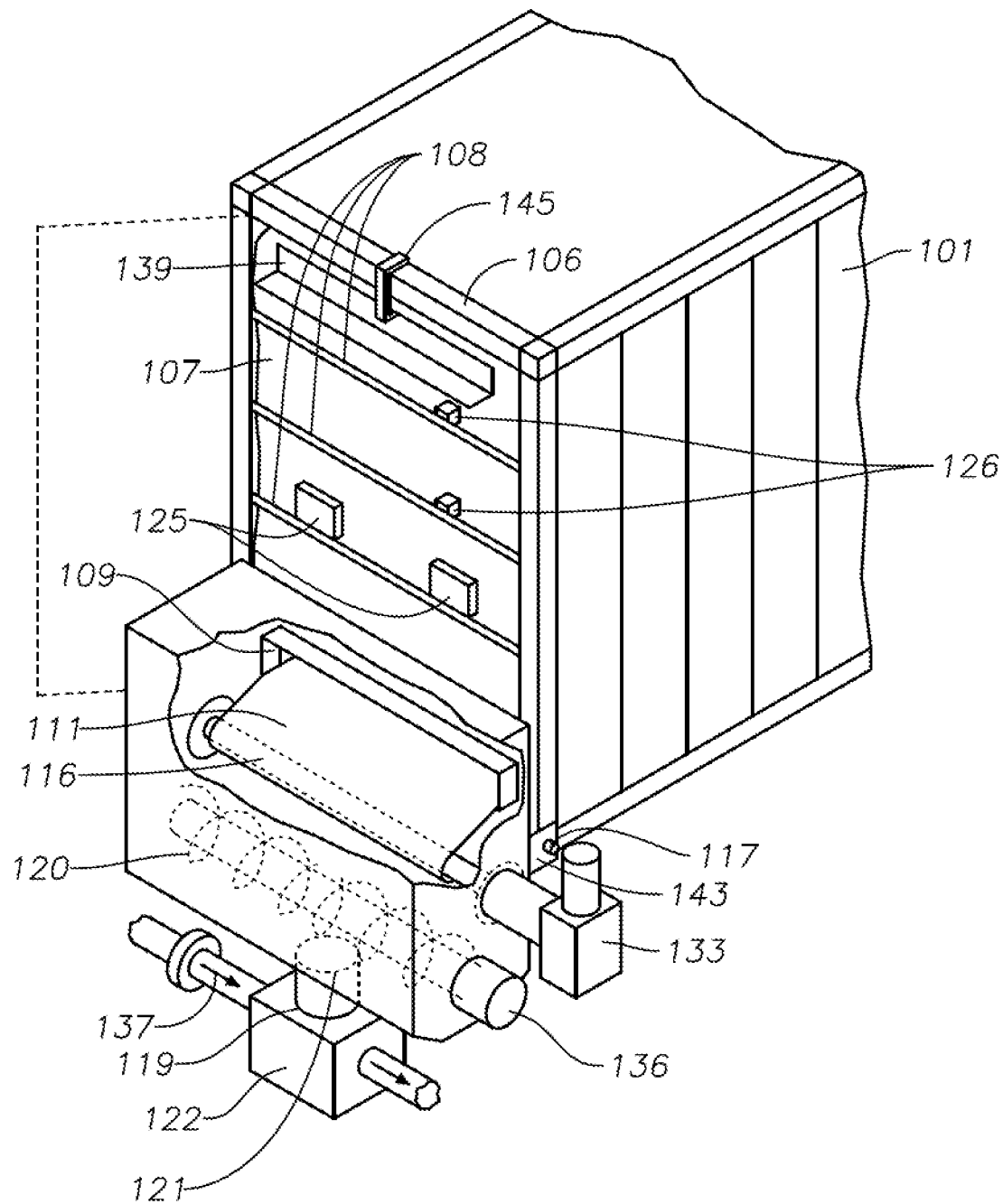
FIG. 3A shows side opposite of FIG. 3 which shows further details of how the second liner floor is coiled in the removal from the container and the relationship to one embodiment of the catcher member or hopper for receiving the bulk cargo and handling it.

First to understand the operation of the system for unloading bulk cargo without tilting the container, reference will be made to FIG. 3 which shows the container 101 and the container liner 100 with the second floor liner 111 and first floor layer 110 in place. The second floor liner 111 is connected to the coiling member 116, which is mounted on a frame 143 removably connected at the corner brackets 140 by mounting bracket 117 to the container 101. The coiling member 116 also has built in a hopper member 118 which has a screw feeding auger 120 which feeds from its two sides to the middle for delivery of bulk cargo 128 to an intake valve 121, like a ball valve not shown, on a distribution system 122, for delivery of the bulk cargo by compressed air 137 through distribution lines 123 to storage facility 124 as shown in FIG. 1. In FIG. 3 it can be seen that the tilt-less liner system has just started to unload the bulk cargo because the tape strip 112 on the first section of the second floor liner 11 is shown broken and the arranged folded stack of over lapping multiple pre-folded sections 141 has started to move because the coiling member 116 would have started to be coiled by the motor 133. At this stage of operation, the vibrators 125 would be operational, as well as the pressure sensors 126 and the ultra-sound depth sensor 127 mounted on a bracket 145 for the ultra-sound depth sensor 127 would have been activated. FIG. 3A shows other side of FIG. 3 with the motor 133 for driving the coiling member 116 and the motor 136 for driving the screw feeding anger 120.

To better understand how the second floor liner 111 works when it is removed from the container 100 and stimulates and causes the bulk cargo to be released and removed from its stacked position and condition over the second floor liner 111, an explanation and description of the configuration of the second floor liner 111 will be made by referring to FIG. 4. FIG. 4 will be broken down into Phases 4a, 4b, 4c, 4d, and 4e and the bulk cargo is represented by force line arrows to explain its effects.

In Phase 4a, the bulk cargo is pressing down on the folded stack 1 as the second floor liner 111 is started to be removed by the coiling member 116. The folded stack 1 is made up of two sheet surfaces which will take bulk cargo away from the location where stack 1 was located. In the removal of stack 1 sheet surfaces the bulk cargo falls down on to stack 2 as shown in 4b.

In Phase 4b, the folded stack 2 which is made up of a two-sheet surface which will take bulk cargo which fell on it away from the location where folded stack 2 was located by the coiling member 116 pulling the second floor liner 111 out. In the removal of stack 2 sheet surfaces the bulk cargo falls down on to stack 3 as shown in 4c.

In Phase 4c, the folded stack 3 is made up of one sheet surface which will take bulk cargo which fell on it away from the location where stack 3 was located by coiling member 116. But the stack 3 one sheet is connected to stack 4 which forms the base of stacks 5 and 6 above stack 4, so when stack 4 is pulled it has a clearing action by forming a moving cup like surface with part of stack 5 for bulk cargo which may have penetrated the open space 142 above and was left by the removal of bulk cargo by stack 1, 2, and 3 and it removal cause a drop in the stacks 5 and 6 above it which causes the bulk cargo over stack 6 to drop down breaking up the bulk cargo from its position stack.

In Phase 4d the stack 5 is made up of a two-sheet surface which does not have bulk cargo on it so when stack 5 is removed stack 5 has a clearing action with its 2 sheets for bulk cargo which may have penetrated the open space 142 above and was left by the removal of bulk cargo by stack 1, 2, 3 and 4 and it removal causes a drop in the stacks above it which causes the bulk cargo over stack 6 to drop down further breaking up the bulk cargo from it position stack.

In Phase 4e the stack 6 is made up of two sheets surfaces one which does not have bulk cargo on it and one with bulk cargo on it. The removal of stack 6 sheet without cargo on it has a clearing action for bulk cargo which may have penetrated the open space 142 above and was left by the removal of bulk cargo by stack 1, 2, 3, 4 and 5 and removal of stack 6 with cargo on it moves the bulk cargo out, but also because the last sheet of stack 6 is pushed down toward the first floor layer 110 it creates a diagonal surface with vector forces to pull bulk cargo loose if any is remaining before the next phase of the removal of the second floor liner 111 is started again. These forces described above are very small, but they operate to remove small particles of bulk cargo and start it moving with the second floor liner 111 for the bulk cargos discharge from the container with the second floor liner 111.

In FIG. 5 the different forces for loosening the bulk cargo are the same as in FIG. 4, but would be multiplied and magnified by having six folded layers stacked over said the first layer 110 which would deepen the distance dropped by the bulk cargo. It would also multiply the number of sheet that would have surface contact with the bulk cargo and enhance the amount of bulk cargo removed.

There are however some common factors that need to be discussed, such as the surface area sizes of the sheets forming the folded stacks. The size or surface area of the folded stacks may vary depending on the force of the bulk cargo created by it weight relative to the tensile strength of the second floor liner 111 being used to be pulled by the coiling member 116, but this can be calculated based on the strength of a single sheet because when the coiling member 116 pulls the second floor liner 111 it is only pulling the load of one pre-folded sheet with bulk cargo loaded over it, plus the friction of the second floor liner 111 with first floor liner friction lowering upper surface unless there are build ups of bulk cargo along the way to the coiling member 116.

Figure 6:
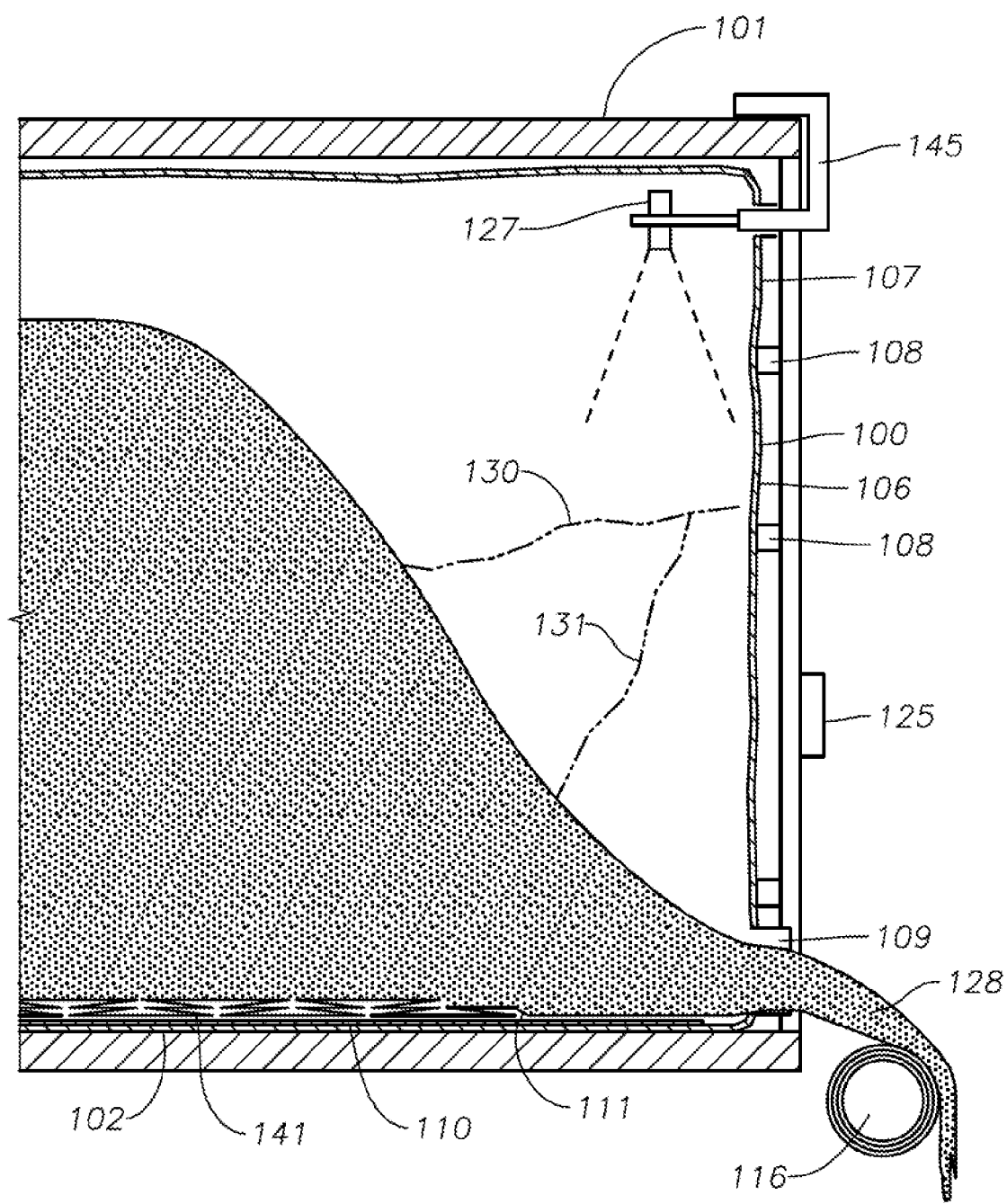
FIG. 6 shows a cross section view taken through FIG. 1 at the bulkhead end of a container and container liner showing the unloading of bulk cargo as the second floor liner is being removed from the container and it shows with hypothetical dashed lines the potential location of bulk cargo build up by the bulk cargo over the bulkhead end of the container liner if bridging starts during the unloading process and it also shows the ultra sound depth measuring device for measuring the depth of the bulk cargo if it starts to stack up so that adjustments in the speed of the coiling member can be adjusted or more vibration can be added to the vibrators to cause the bulk cargo to break up and be discharged with more of the second floor liner being pulled out of the container and container liner and prevent those stacked piles from forming.

One place where build ups of bulk cargo can occur is at the bulkhead 107 at the port 109 as shown in FIG. 6 where theoretical build ups or piles are shown of the bulk cargo 128. These bulk cargo build ups 129 can be created in the form of linear build up 130 or high build ups 131. But in either case once the depth data from the ultra-sound depth sensors 127, as shown in FIG. 6, is used to determine depth of a build up, a solution for the build up problem of bulk cargo can be implemented. Generally, the solution is to reduce the speed of the second floor liner 111 being coiled up by the coiling member 116 and apply vibrations from the vibrators 125 mounted on the steel bars 108 to break up the build up and control the speed of the second floor liner 111 removal of the bulk cargo until the build up is removed and the bulk cargo 128 is flowing out smoothly without any build up, as shown in FIG. 6. FIG. 6 shows how second floor liner 111 slides over first layer member 110 where all the folded stacks have been unfolded and the second floor liner 111 is in one on one contact with the first layer member 110.

Figure 7:
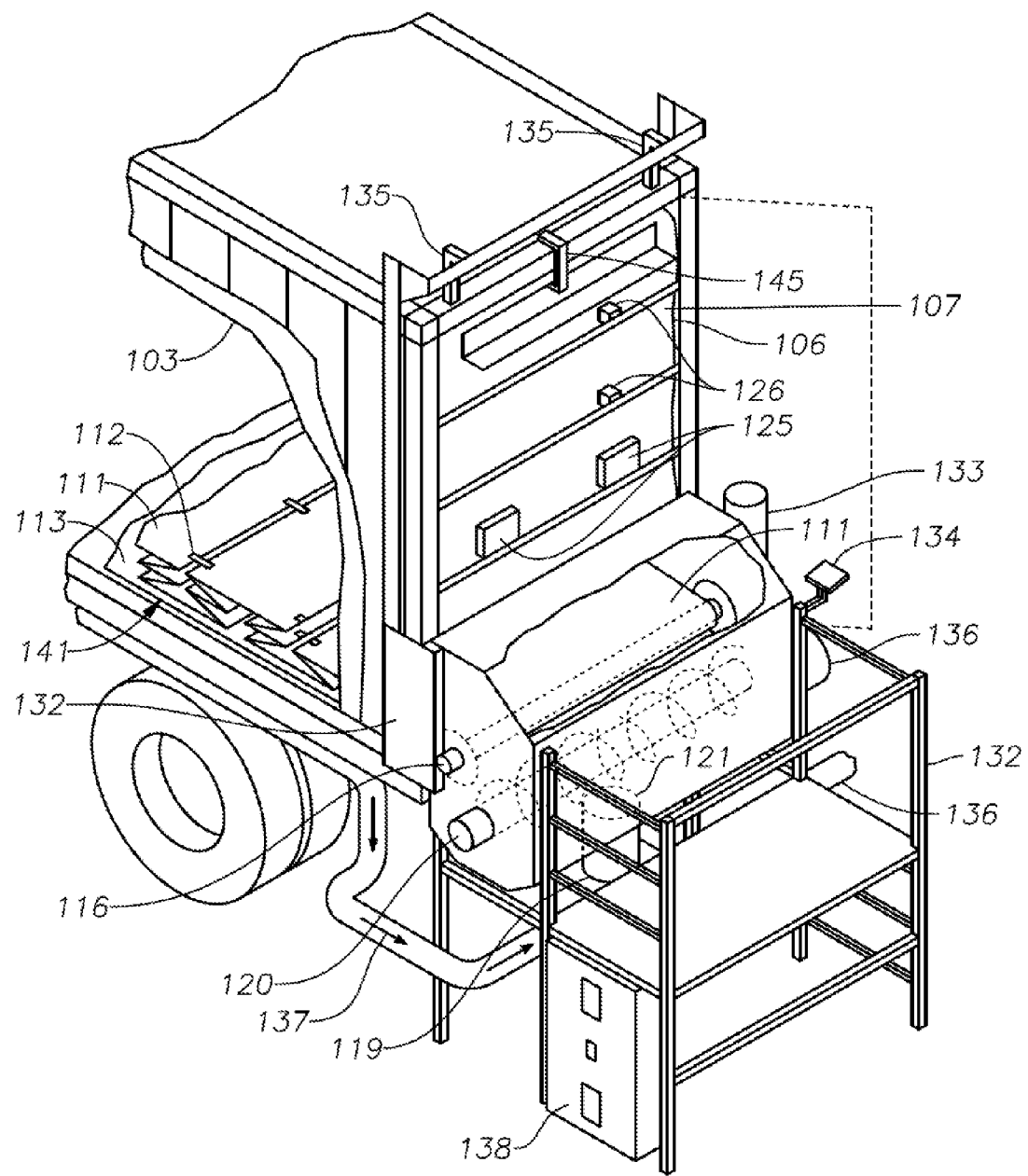
FIG. 7 shows a container securing frame for being positioned in operational relationship with a container mounted on a truck flatbed or other transport means. The container securing frame has mounted on it removable connections for connecting to a container and for aligning its operational members such as the coiling member with the second floor liner for attachment and coiled removal of the second floor liner. The container securing frame further has mounted to it a hopper member, and distribution member which are in operational connection. Also, operationally connected to the container securing frame are the vibrators, pressure sensors, and depth sensor which feed through to a computer control panel for coordinated operation of and integration of all the elements which are part of this system for removal of the bulk cargo without tilting the container for unloading the bulk cargo from the container.

While individual pieces of the system and apparatus for unloading bulk cargo can be used to affect the unloading of bulk cargo, it is generally preferred to use an integrated system which has data stored, or a stored recipe, for the different kinds of bulk cargo which has different properties. So for example, operating parameters for various materials with high angle of Repose, Hauser's ratio, aerated angle of repose, etc have predetermined operating variables which can be integrated for unloading a particular bulk cargo with its known operating characteristics. To this end a container securing frame 132 may be used for removably connection to and alignment with a container 101 which is loaded on a trailer, such as shown in FIG. 7. In this embodiment, a container 101 loaded with bulk cargo 128 would be backed up to a container securing frame 132 having centering members 135 to locate the container 101 in alignment for connecting the second floor liner 111 with the coiling member 116 and motor 133 already built in and connected to it and connected to computer control panel 134. In this embodiment, the hopper member 118 and the screw feeding auger 120 with a motor 136 are also connected to computer control panel 134. Also provided would be the distribution member 119 for the controlled distribution of the bulk cargo 128 by compressed air 137 used to drive the bulk cargo to its desired location would also be connected to computer control panel 134. The ultra-sound depth sensors 127 would be locates on the centering members 135 positioned through instrument port 139 and connected to the computer control panel 134. Also connected to the computer control panel 134 but for removable positioning on the steel bars 108 of the bulkhead would be the vibrators 125 and the pressure sensors 126. A power distribution box 138 would also be provided to control all the instruments connected to the container securing frame 132 to provide a full set of controls, power and instruments with computer data to manage unloading bulk cargo without tilting the container. The use of container securing frame 132 with full instrumentation would give an operator full control of the process of unloading buck cargo without tilting the container.

In view of the foregoing, it is intended that the present invention cover modifications and variations of this invention, provided they fall within the scope of the following claims and their equivalent.

The invention claimed is:

1. A tilt-less liner apparatus and system for unloading bulk cargo from a container liner placed in a container which container liner has been loaded using said tilt-less liner apparatus with bulk cargo on top and said container liner has a linear floor located between two sidewalls of said container liner and having a front end and a back end formed into a bulkhead, by ridged members being placed across said back end of said container liner, to retain said bulk cargo in said container liner and with at least one port in said back end substantially the width of said container liner floor between said two side walls and located proximate said container liner floor for allowing unloading of said bulk cargo therethrough comprising:

a. a first layer means placed on said linear liner floor of said container liner to cover said container liner floor having a friction lowering upper surface and a friction promoting lower surface laid against said container liner floor for restricting the movement of said first layer means, b. a second floor liner composed of a flexible high strength material laid over said first layer means, in contact with said friction lowering upper surface of said first layer means for allowing easy movement there across, and arranged in stacks of over lapping multiple pre-folded sections of from at least two to up to ten folded layers stacked over said first layer means covering said container liner floor for removal of said bulk cargo with said second floor liner;

c. a coiling means removably connected to said container and to said second floor liner at said back end for pulling said second floor liner over said friction lowering upper surface of said first layer means and out of said stacks of over lapping pre-folded arrangement and out of said container liner causing said bulk cargo to move out with said second floor liner as said second floor liner is coiled on said coiling means and moved out of said container liner;

d. a hopper means provided below said coiling means for receiving said bulk cargo as said coiling means coils up said second floor liner on said coiling means and said second floor liner is moved from said container liner and for processing said bulk cargo for distribution; and e. a distribution means provided in said hopper means for the collection of said bulk cargo from said hopper means for controlled distribution of said unloaded bulk cargo.

2. A tilt-less liner apparatus and system for unloading bulk cargo from a container liner in a container of claim 1 wherein said second floor liner composed of flexible high strength material in arranged stacks of over lapping multiple pre-folded sections of from at least two to up to ten folded layers stacked over said first layer means covering said container liner floor further comprises;

a. serial stacks of over lapping multiple pre-folded sections of from at least two to up to ten folded layers stacked and arranged with said stacks of said pre-folded sections being in alternating opposite directions for creating different pulling force effects for loosening said bulk cargo for removal with said second floor liner as said second floor liner is removed from said container liner by coiling said second floor liner on said coiling means.

3. A tilt-less liner apparatus and system for unloading bulk cargo from a container liner in a container of claim 2 wherein said second floor liner composed of serial stacks of over lapping multiple pre-folded sections of from at least two to up to ten folded layers stacked and arranged with said stacks of said pre-folded sections being in alternating opposite directions further comprising;
   a. serial stacks of over lapping multiple pre-folded sections of from at least two to up to ten folded layers stacked and arranged with said stacks of said pre-folded sections being in alternating opposite directions from said front end of said container liner to said back end of said container liner for creating different pulling force effects for loosening said bulk cargo for removal of said bulk cargo with said second floor liner as said second floor liner is removed from said container liner by coiling said second floor liner on said coiling means.

4. A tilt-less liner apparatus and system for unloading bulk cargo from a container liner in a container of claim 3 wherein serial stacks of over lapping multiple pre-folded sections of from at least two to up to ten folded layers stacked and arranged with said stacks of said pre-folded sections being in alternating opposite directions further comprising;
   a. said serial stacks of over lapping multiple pre-folded sections of from at least two to up to eight folded layers stacked are arranged with spaced apart openings to receive some of said bulk cargo for creating different pulling force effects against said bulk cargo and for breaking up and moving said bulk cargo for removal with said second floor liner as said second floor liner is removed from said container liner by coiling said second floor liner on said coiling means.

5. A tilt-less liner apparatus and system for unloading bulk cargo from a container liner in a container of claim 4 further comprising;
   a. releasable tape strips applied to said serial stacks of over lapping multiple pre-folded sections of from at least two to up to ten folded layers stacked for holding said folded layers stacked in position when said folded layers stacked are positioned on said first layer means for receiving said loading of said bulk cargo, but release upon removal of said second floor liner by said coiling means.

6. A tilt-less liner apparatus and system for unloading bulk cargo from a container liner in a container of claim 5 further comprising;
   a. an inflatable and deflate able fluid pillow for covering said at least one port in said bulkhead and preventing bulk cargo from passing out when said fluid pillow is inflated but allowing bulk cargo and said second floor liner to pass out said at least one port for unloading said bulk cargo when said fluid pillow is deflated.

7. A tilt-less liner apparatus and system for unloading bulk cargo from a container liner in a container of claim 6 further comprising;
   a. a gravitational scraper means formed by locating said hopper means at an angle of 45 degrees or more below said coiling means connected to said second floor liner where said second floor liner is coiled for removing any excess bulk cargo from said second floor liner.

8. A tilt-less liner apparatus and system for unloading bulk cargo from a container liner in a container of claim 7 further comprising;
   a. At least one motor means connected to said coiling means for turning said coiling means for pulling said second floor liner out of said container liner and
   b. control means on said at least one motor means to vary pulling power and adjusting removal speed of said second floor liner and bulk cargo out of said container liner.

9. A tilt-less liner apparatus and system for unloading bulk cargo from a container liner in a container of claim 8 further comprising;
   a. At least one or more vibrator means located and removably connected on said ridged members across said back end of said container liner formed into said bulkhead across said back end of said container liner for breaking up bulk cargo piled up against said container liner bulkhead to control accumulation of bulk cargo, and
   b. Control means on said one or more vibrator means for varying the frequency and intensity of said vibrator means.

10. A tilt-less liner apparatus and system for unloading bulk cargo from a container liner in a container of claim 9 further comprising;
   a. At least one or more depth sensor means located and removably connected proximate said back end of said container liner formed into said bulkhead across said back end of said container liner for measuring the depth of said bulk cargo if any is piled up against said bulkhead as said second floor liner is pulled out of said container liner and coiled up on said coiling means.

11. The tilt-less liner apparatus and system for unloading bulk cargo from a container liner in a container of claim 8 wherein said distribution means further comprises;
   a. bulk cargo handling means for receiving said bulk cargo and processing said bulk cargo for moving said bulk cargo to a desired location and in desired quantities.

12. The tilt-less liner apparatus and system for unloading bulk cargo from a container liner in a container of claim 10 further comprising;
   a. a computer control means for receiving and for sending signals to control said pulling power and adjusting said speed of said at least one motor means connected to said coiling means for controlling the speed of said second floor liner as it is pulled out of said container liner; said vibration of said at least one or more vibrator means; and to provide read outs of at least one or more depth sensor means removably connected to said bulkhead; and for controlling of said distribution means provided in said hopper means for processing said bulk cargo for controlled distribution of said unloaded bulk cargo; and
   b. means for operator input and automatic control of said computer control means.

13. The tilt-less liner apparatus and system for unloading bulk cargo from a container liner in a container of claim 1 wherein said first floor layer means further comprises
   a. a fluidizing system means positioned between said container liner floor and said second floor layer means for providing a friction lowering upper surface provided by fluid flow for allowing easier movement of said second floor liner out of said container liner when being pulled out by said coiling means removably connected to said second floor liner for coiling said second floor liner.

14. The till-less liner apparatus and system for unloading bulk cargo from a container liner in a container of claim 13 wherein said second floor liner further comprises;

a. flexible high strength material strips for being part of said second floor liner in spaced apart relationship over the width of said second floor liner and running said length of said second floor liner to provide increased strength and allow higher pulling forces on said second floor liner without damage to said second floor liner as pulled out.

15. The tilt-less liner apparatus and system for unloading bulk cargo from a container liner in a container of claim 14 wherein said second floor liner having flexible high strength material strips for being part of said second floor liner in spaced apart relationship over the width of said second floor liner and running the length of said floor liner to provide increased strength further comprises;
   a. aperture means in said second floor liner in said surfaces in spaced apart relationship over said flexible high strength material strips for allowing fluidizing fluids to pass through said second floor liner to fluidize said bulk cargo as said second floor liner is pulled out by coiling said second floor liner.

16. A tilt-less liner apparatus and system for unloading bulk cargo from a container liner placed in a container which container liner has been loaded using said tilt-less liner apparatus and with bulk cargo using said system in said container liner having a linear liner floor located between two sidewalls of said container liner and having a front end and a back end which is formed into a bulkhead, by ridged members being placed across said back end of said container liner, to retain said bulk cargo in said container liner and with a port in said back end substantially the width of said container liner floor between said two side walls and located at said container liner floor where said back end meets said container liner floor for allowing unloading of said bulk cargo therethrough comprising;
   a. first layer means placed on said linear liner floor of said container liner to cover said container liner floor having a friction lowering upper surface and a friction promoting lower surface laid against said container liner floor for restricting the movement of said first layer means,
   b. a second floor liner composed of a flexible high strength material laid over said first layer means, in contact with said friction lowering upper surface of said first layer means for easy movement there across, and arranged in stacks of over lapping multiple pre-folded sections of from at least two to up to eight folded stacked layers over said first layer means covering said container liner floor;
   c. a container securing frame for removably connecting to and aligning with said container;
   d. a coiling means connected to said container securing frame and adjustable for removable connection to said second floor liner at said back end for pulling said second floor liner over said friction lowering upper surface of said first layer means and out of said stacked over lapping pre-folded arrangement and out of said container liner causing said bulk cargo to move out with said second floor liner as said second floor liner is coiled on said coiling means and moved out of said container liner;
   e. a hopper means connected to said container securing frame and positioned below said coiling means and adjustable for aligning with said container at said bulkhead end of said container liner for receiving said bulk cargo as bulk cargo drops off said second floor liner as said coiling means removes said second floor liner from said container liner; and
   f. a distribution means provided to said hopper means for the collection of said bulk cargo from said hopper means for controlled distribution of said unloaded bulk cargo.

17. A tilt-less liner apparatus and, system for unloading bulk cargo from a container liner in a container of claim 14 wherein said second floor liner composed of flexible high strength material in arranged stacks of over lapping multiple pre-folded sections of from at least two to up to ten folded layers stacked over said first layer means covering said container liner floor further comprises;
   a. serial stacks of over lapping multiple pre-folded sections of from at least two to up to eight folded layers stacked and arranged with said stacks of said pre-folded sections being in alternating opposite directions for creating different pulling force effects for loosening said bulk cargo for removal of said bulk cargo with said second floor liner as said second floor liner is removed from said container liner by coiling said second floor liner on said coiling means.

18. A tilt-less liner apparatus and system for unloading bulk cargo from a. container liner in a container of claim 17 wherein serial stacks of over lapping multiple pre-folded sections of from at least two to up to ten folded layers stacked and arranged with said stacks of said pre-folded sections being in alternating opposite directions further comprising;
   a. said serial stacks of over lapping multiple pre-folded sections of from at least two to up to eight folded layers stacked are arranged with spaced apart openings to receive some of said bulk cargo for creating different pulling force effects against said bulk cargo and for breaking up and moving said bulk cargo for removal with said second floor liner as said second floor liner is removed from said container liner by coiling said second floor liner on said coiling means.

19. A tilt-less liner apparatus and system for unloading bulk cargo from a container liner in a container of claim 18 further comprising;
   a. a gravitational scraper means formed by locating said hopper means at an angle of 45 degrees or more below said coiling means connected to said second floor liner where said second floor liner is coiled for removing any excess bulk cargo from said second floor liner.

20. A tilt-less liner apparatus and system for unloading bulk cargo from a container liner in a container of claim 19 further comprising;
   a. At least one motor means connected to said coiling means for turning said coiling means for pulling said second floor liner out of said container liner and
   b. control means on said at least one motor means to vary pulling power and adjusting removal speed of said second floor liner and bulk cargo out of said container liner.

21. A tilt-less liner apparatus and system for unloading bulk cargo from a container liner in a container of claim 20 further comprising;
   a. At least one or more vibrator means connected to said container securing frame and removably and remotely connected on said ridged members across said back end of said container liner formed into said bulkhead across said back end of said container liner for breaking up bulk cargo piled up against said container liner bulkhead to control accumulation of bulk cargo, and
   b. Control means on said one or more vibrator means for varying the frequency and intensity of said vibrator means.

22. A tilt-less liner apparatus and system for unloading bulk cargo from a container liner in a container of claim 21 further comprising;
   a. An extension member connected to said container securing frame for providing a mounting means for at least one or more depth sensor means and for positioning said at least one or more depth sensor means proximate said back end of said container liner formed into said bulkhead when said container securing frame is connected to said container at said back end of said container liner for measuring the depth of said bulk cargo if any is piled up against said bulkhead as said second floor liner is pulled out of said container liner and coiled up on said coiling means.

23. A tilt-less liner apparatus and system for unloading bulk cargo from a container liner in a container of claim 22 further comprising;
   a. a computer control panel mounted on said container securing frame and connected for receiving and for sending signals to control said pulling power and adjusting said speed of said at least one motor means connected to said coiling means for controlling the speed of said second floor liner as it is pulled out of said container liner; to control said vibration of said at least one or more vibrator means; and to provide read outs of at least one or more depth sensor means removably positioned in said container liner at said bulkhead; and for controlling of said means provided in said hopper means for processing said bulk cargo for controlled distribution of said unloaded bulk cargo to adjust and optimize the unloading of said tilt-less apparatus, and
   b. means for operator input and automatic control of said computer control panel for automatic unloading said bulk cargo from said container liner in said container when said container securing frame is secured to said container and connected for operation with said container, container liner and said tilt-less apparatus.

* * * * *